(12) United States Patent
Andersen et al.

(10) Patent No.: US 9,261,071 B2
(45) Date of Patent: Feb. 16, 2016

(54) MOUNTING ARRANGEMENT FOR PITCH GEAR

(75) Inventors: Jesper Lykkegaard Andersen, Hornslet (DK); Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1089 days.

(21) Appl. No.: 13/312,118

(22) Filed: Dec. 6, 2011

(65) Prior Publication Data

US 2012/0148410 A1    Jun. 14, 2012

Related U.S. Application Data

(60) Provisional application No. 61/420,940, filed on Dec. 8, 2010.

(30) Foreign Application Priority Data

Dec. 8, 2010    (GB) .................................... 1020828.8

(51) Int. Cl.
*F03D 7/02*    (2006.01)
*F03D 1/00*    (2006.01)
(Continued)

(52) U.S. Cl.
CPC .............. *F03D 1/001* (2013.01); *F03D 1/0658* (2013.01); *F03D 1/0691* (2013.01); *F03D 7/0224* (2013.01); *F03D 11/0008* (2013.01); *F05B 2260/79* (2013.01); *Y02E 10/721* (2013.01); *Y02E 10/722* (2013.01); *Y02E 10/723* (2013.01); *Y02E 10/728* (2013.01)

(58) Field of Classification Search
CPC ... F16C 2300/14; F03D 1/001; F03D 1/0691; F03D 1/0658; F03D 7/0224; F03D 11/0008; F05B 2260/79
USPC ........... 416/147, 155, 156, 174, 205, 207–209
See application file for complete search history.

(56) References Cited

U.S. PATENT DOCUMENTS

2003/0116970 A1*  6/2003  Weitkamp et al. ............... 290/44
2003/0147751 A1*  8/2003  Wobben ........................ 416/174
(Continued)

FOREIGN PATENT DOCUMENTS

EP    1 367 274    12/2003
EP    1 788 238    5/2007
(Continued)

OTHER PUBLICATIONS

English Machine Translation of EP 1 367 274, Dec. 3, 2003.*
(Continued)

*Primary Examiner* — Christopher Verdier
(74) *Attorney, Agent, or Firm* — Wood, Herron & Evans, LLP (57) ABSTRACT

A system for a wind turbine includes a pitch system having a blade pitch bearing and a wind turbine hub, the pitch bearing being attached to the wind turbine hub and arranged to be attachable to a wind turbine rotor blade. A pitch gear, having a gear surface for engaging with an actuator, such as a pinion, is releasably coupled to the pitch system so that the pitch gear, under the action of the actuator, causes relative rotation between the hub and the relevant part of the bearing. Releasably coupling the gear surface to the pitch system can allow easy replacement of the gear without requiring the removal of large components such as the bearing.

12 Claims, 10 Drawing Sheets

(51) Int. Cl.
*F03D 1/06* (2006.01)
*F03D 11/00* (2006.01)

(56) References Cited

U.S. PATENT DOCUMENTS

| | | | |
|---|---|---|---|
| 2009/0016885 A1* | 1/2009 | Bech | 416/155 |
| 2009/0175724 A1* | 7/2009 | Russ et al. | 416/131 |
| 2009/0220343 A1 | 9/2009 | Dimascio | |

FOREIGN PATENT DOCUMENTS

| | | | |
|---|---|---|---|
| EP | 2253841 | A2 | 11/2010 |
| EP | 2458200 | A1 | 5/2012 |
| WO | 2007/006301 | A1 | 1/2007 |
| WO | 2007098759 | A2 | 9/2007 |
| WO | 2011110453 | A2 | 9/2011 |
| WO | 2012072627 | A1 | 6/2012 |

OTHER PUBLICATIONS

James Paddock; Combined Search and Examination Report issued in priority Great Britain Application No. GB1020828.8; Apr. 11, 2011; 5 pages; Great Britain Intellectual Property Office.

European Search Report in corresponding European Patent Application No. 11192207.6, dated Dec. 1, 2014, 7 pgs.

* cited by examiner

MOUNTING ARRANGEMENT FOR PITCH GEAR

CROSS-REFERENCE TO RELATED APPLICATIONS

This application claims priority under 35 U.S.C. §119(a) to Great Britain Application No. 1020828.8, filed Dec. 8, 2010. This application also claims the benefit of U.S. Provisional Application No. 61/420,940, filed Dec. 8, 2010. Each of these applications is incorporated by reference herein in its entirety.

TECHNICAL FIELD

This invention relates to wind turbines and more specifically to an arrangement for mounting a blade pitch gear within a turbine structure.

BACKGROUND

Figure 1:
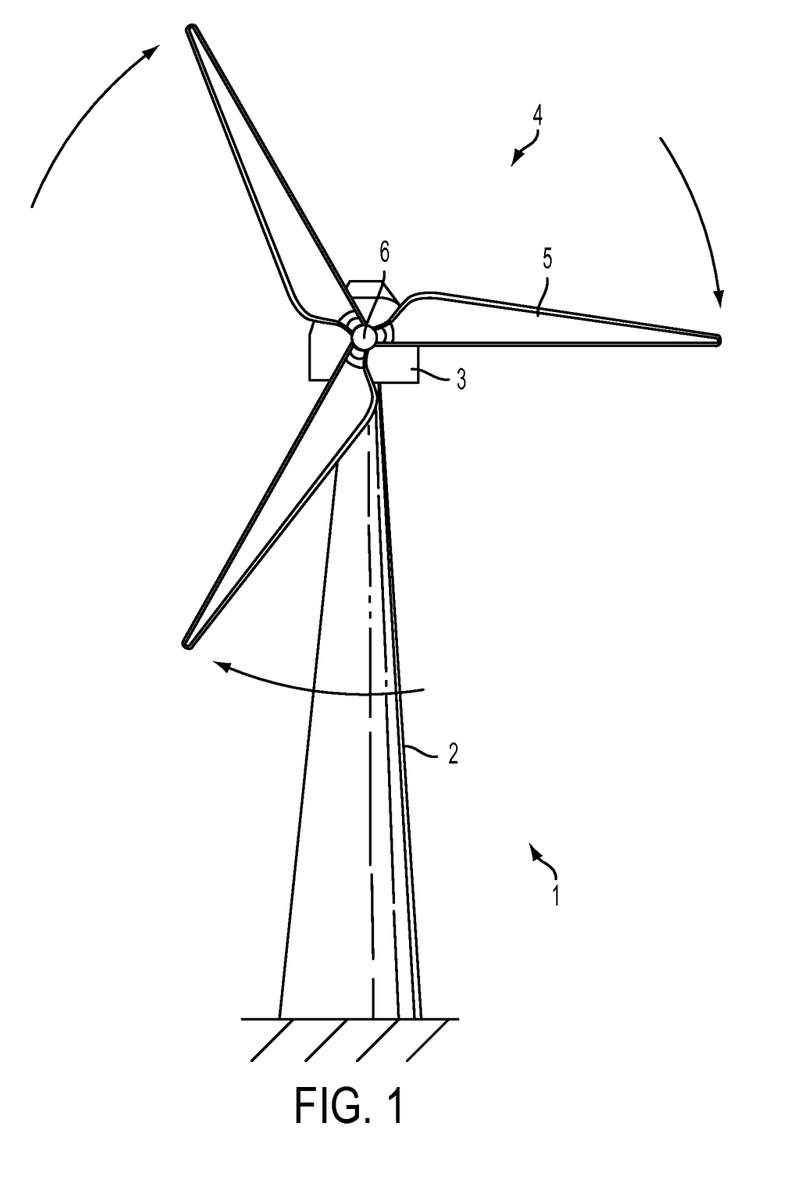
FIG. 1 is a front view of a horizontal axis wind turbine.

FIG. 1 illustrates a wind turbine 1, comprising a tower 2 on which a nacelle 3 is mounted. At least one turbine blade 5 is mounted on a hub 6 to form a rotor 4. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm. In the latter case, the diameter of the rotor may be as large as 150 metres or more.

The rotor blades of wind turbines are designed to extract power from the wind by virtue of their aerodynamic shape, and subsequent wind induced rotation. For horizontal axis wind turbines, the blades rotate around a rotor hub attached to a nacelle mounted on a wind turbine tower, and the rotation of the rotor turns a drive shaft connected in turn to a generator which produces electricity. For horizontal axis wind turbines to operate efficiently and extract the maximum power from the wind, the wind turbine nacelle, and the axis around which the wind turbine rotor rotates, is angled into the wind to the greatest extent possible such that the rotational axis of the rotor is aligned with the wind direction.

Figure 2:
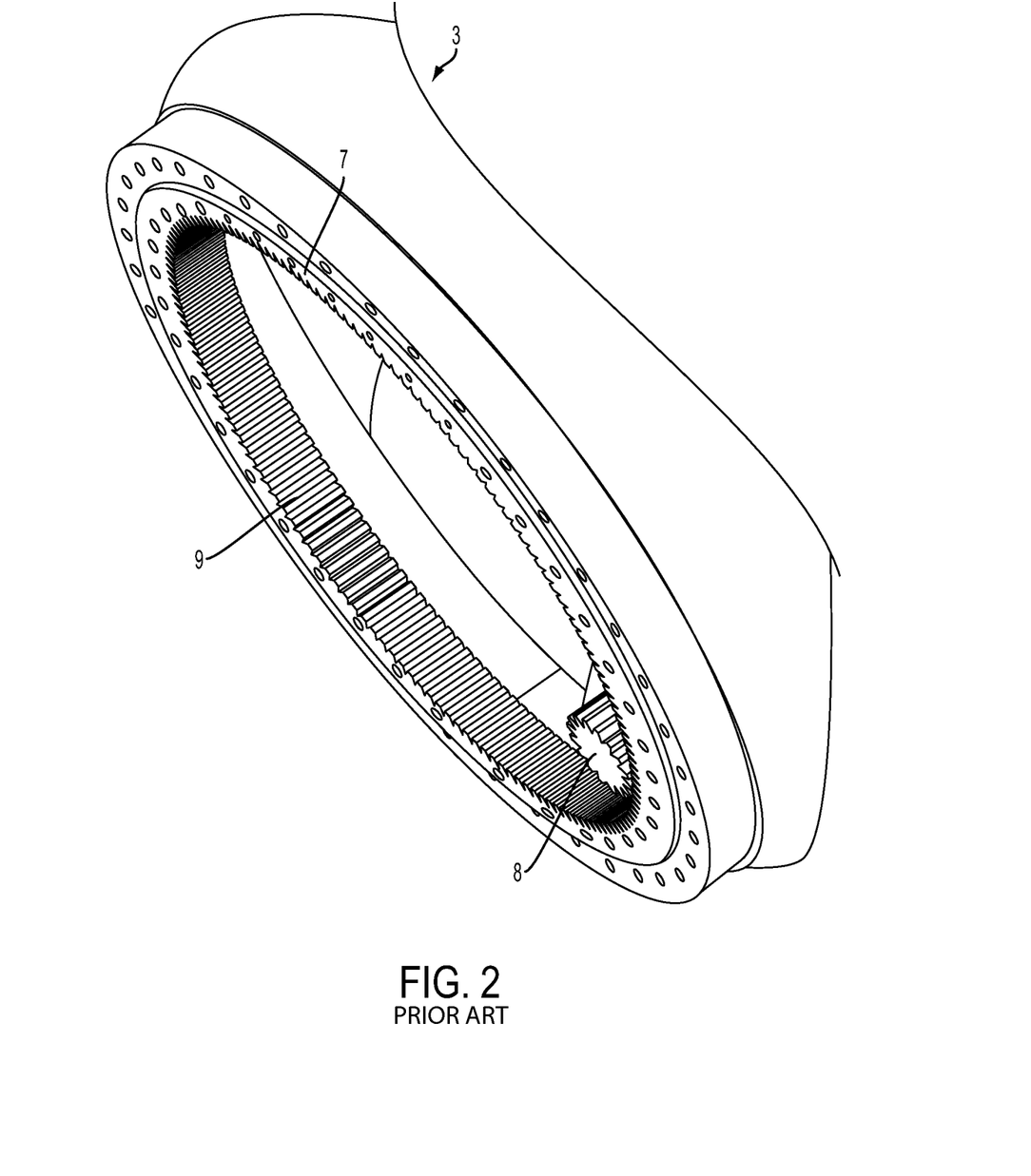
FIG. 2 is a schematic illustration showing a known pitch control system.

Modern wind turbines control the load on the rotor by pitching the blades in and out of the incoming wind. The blades are pitched to optimize the output or to protect the wind turbine from damaging overloads during high winds. FIG. 2 shows a known pitching arrangement between a hub 3 and a blade (not shown). The pitch bearing 7 is located between the hub and the blade and in modern turbines can have a diameter as large as 2 metres up to 6 metres. A gear 9 is formed on the pitch bearing 7, usually by machining the gear ring into the pitch bearing material, and a torque is applied by a pinion 8 to the gear to turn the pitch bearing. The pinion is turned by one or more actuators, such as a hydraulic cylinder or electric motor, to provide the torque for pitching the blade and maintaining it in a given position. Such a pitching arrangement enables each blade to be turned approximately 90°-100° around their longitudinal axis.

A problem with pitch bearings for wind turbines is that they are not operated like traditional gear systems. The gear goes through long periods of inactivity, in which it is not necessary to change the pitch of the blades. When the blades are pitched, only relatively small rotations are required to control the power and speed of the rotor when the turbine is being used to extract energy from oncoming wind, this being within what will be called the "operational range" for pitching. The result is that the pinion spends most of the time engaged with, and travelling over, a short section of the gear surface. Typically this equates to around 30°-35° of the gear surface, defined by the angle of a segment of the gear ring. This leads to accelerated wear, and when the small section of gear covering adjustments in the operational range becomes worn the entire gear must be replaced. Because the gear is formed directly on the blade bearing the entire bearing, or bearing ring, must be replaced, which is expensive and difficult.

We have appreciated that it would be advantageous to provide a gear for a turbine pitch system that can be easily replaced.

SUMMARY

Aspects of the invention are defined in the independent claims to which reference should now be made. Advantageous features are set forth in the dependent claims.

Embodiments of the invention provide a system or apparatus for a wind turbine. The system/apparatus comprises a pitch system, the pitch system comprising a blade pitch bearing and a wind turbine hub, the pitch bearing being attached to the wind turbine hub and arranged to be attachable to a wind turbine rotor blade. The blade pitch bearing serves to pitch the rotor blade relative to the hub. A pitch gear assembly, comprising a gear having a gear surface for engaging with an actuator such as a pinion, is releasably coupled to the pitch system, by coupling to a component thereof, preferably either by coupling to the pitch bearing, or by coupling to the hub, so that the pitch gear, under the action of the actuator, causes relative rotation between the hub and the relevant part of the bearing. Releasably coupling the gear surface to the pitch system can allow easy replacement of the gear without requiring the removal of large components such as the bearing.

Preferably, the pitch system comprises a flange or member for coupling the gear to the pitch system, the flange being a projecting support for attaching one component to another. The flange is supported on the pitch system and is arranged to support the gear such that it is separate from, or held away from, the pitch bearing, or the hub, preferably such that the gear, and gear surface, is supported between the axis of rotation of the pitch bearing and the pitch bearing circumference, specifically between the axis of rotation of the pitch bearing and, in the case of a circular or elliptical bearing, the curved wall of a cylinder passing through the pitch bearing circumference and being parallel to the axis of rotation of the pitch bearing. The flange preferably extends in a direction substantially perpendicular to the axis of rotation of the pitch bearing. By providing a flange or support to hold it, the gear does not need to be directly attached to, or formed as part of, the components of the pitch system, and particularly the pitch bearing, and can be moved to a location away from the pitch bearing and/or the hub. This allows the pitch gear to be supported away from the bearing or hub in a more convenient location in which it can be easily removed, as well as allowing more design flexibility in deciding where to locate the gear and corresponding pinion.

The flange may comprise a first portion and a second portion, with the first portion connecting to the pitch bearing and supporting the second portion, separating the second portion from the pitch bearing by a distance along a line parallel to the bearing axis so that the second portion is held away from the bearing, in a position closer to the blade tip than the bearing is to the blade tip. The second portion then extends into a space between the circumference of the pitch bearing and the axis of rotation of the pitch bearing. This allows the flange to be coupled to a blade mounting arrangement in which a mounting assembly connects a blade to the pitch bearing since the first portion can be part of the mounting assembly, either formed integrally with it or being attachable thereto. This also allows a blade with a pitching system to be mounted on the middle ring of a three ring bearing.

The pitch gear may be mounted on the bearing or to the flange using one or more releasable fasteners such as screws or bolts. When using a flange, the gear can then be supported proximate to the inner circumference of the flange, between the flange and the axis of rotation of the bearing.

The flange is preferably in the shape of an annulus. The annular flange may have one or more holes formed therein to allow releasable fasteners 67, such as a nut and bolt, between the bearing and the hub to be adjusted or replaced. The holes can be distributed at a predetermined radius corresponding to the radial position of a fastener between the pitch bearing and a wind turbine hub, and would be sized so as to allow access to the fasteners.

In certain embodiments, the flange may comprise a plurality of elongated members, such as spokes or poles or beams.

The gear is preferably a gear ring, and may extend around at least a portion of the circumference of the flange.

A pitch sub assembly may also be provided which can be used in the pitch system of embodiments of the invention. The pitch sub assembly comprises a pitch bearing, that is arranged to be attachable to a wind turbine hub and wind turbine blade by suitable fasteners, and a pitch gear releasably coupled to the pitch bearing.

BRIEF DESCRIPTION OF THE DRAWINGS

Embodiments of the invention will now be described, by way of example only, and with reference to the accompanying drawings, in which.

DETAILED DESCRIPTION

Figure 3:
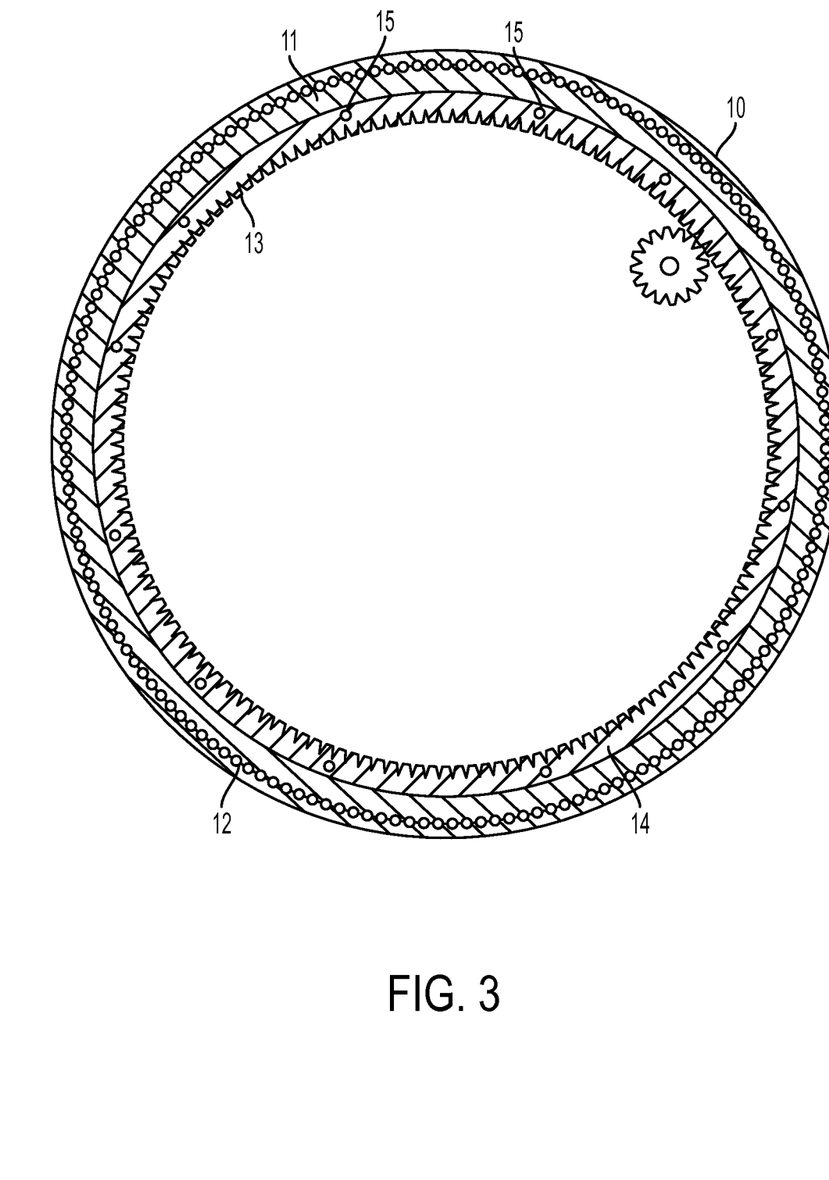
FIG. 3 is a cross section of a portion of a pitch system according to an embodiment of the present invention.

FIG. 3 shows a top down view of a pitch system according to an embodiment of the present invention. The pitch system comprises an outer ring 10 and inner ring 11 having sliding means located between them to allow them to rotate relative to each other. In this example, the sliding means is in the form of a number of ball rollers 12. The inner ring of the bearing has a gear surface 13, comprising a set of teeth, coupled to it that engages with a pinion or other type of actuator to impart a force on the inner ring and rotate it relative to the outer ring. Typically the inner ring would be attached to the turbine blade to be pitched, and the outer ring would be attached to the turbine hub, although the opposite is possible if the gear surface were to extend around the outer circumference of the outer ring.

The gear surface 13 is attached to the inner ring 11 by releasable attachment member or attachment means. In this example, a support member or flange 14 extends over the inner ring 11 to provide an annular mating surface for contacting the bearing ring, and receiving releasable attachment means 15 such as bolts or screws. The support member or flange may be integral with the gear surface, and the gear may directly contact the inner ring, or it may be supported away from it by the support member. A complementary support member or flange may be provided on the opposing side of the inner ring. As an alternative, the gear surface may have recesses formed therein to receive releasable fasteners which would pass directly into the inner ring, preferably in a radial manner. For example, screws or bolts may pass through holes or recesses formed between teeth and into corresponding holes or recesses in the bearing.

Figure 4:
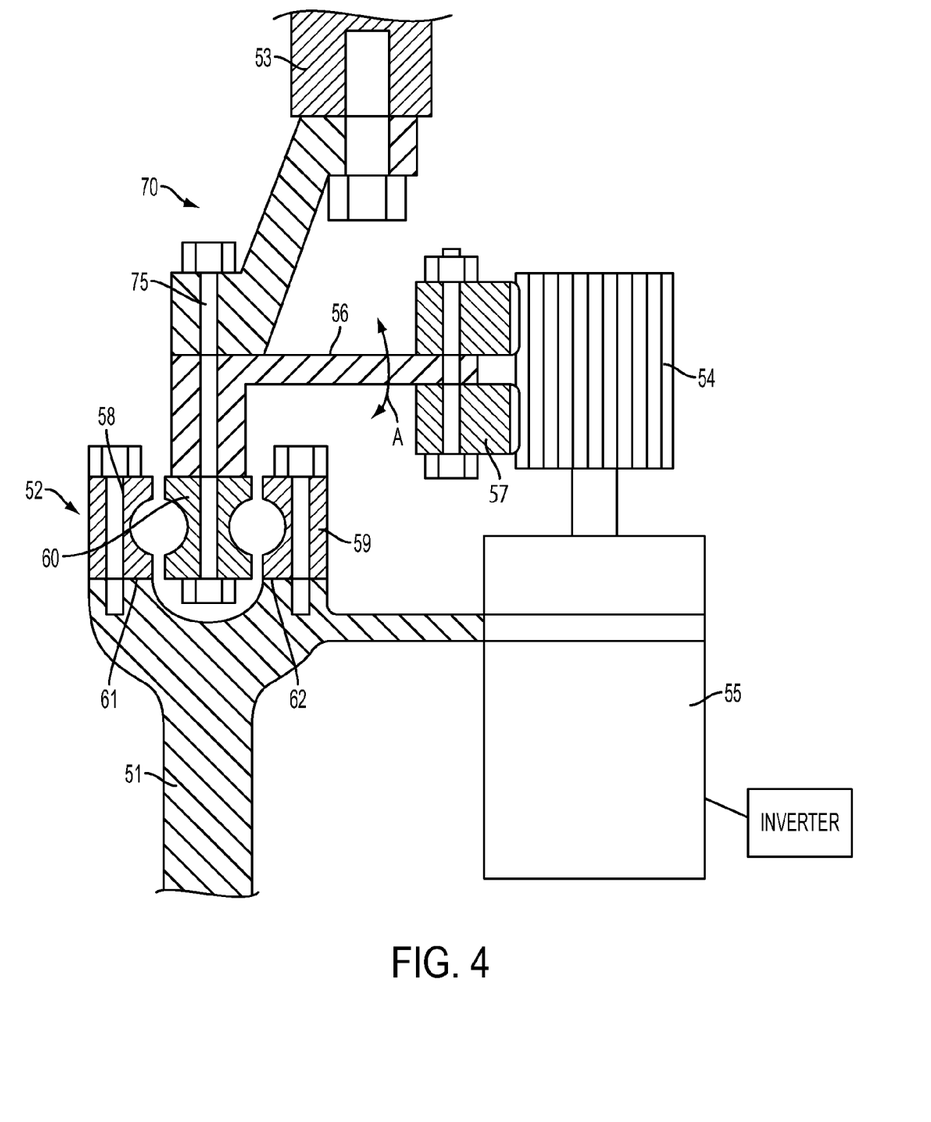
FIG. 4 is a cross section of a portion of a blade coupling arrangement and gear support arrangement according to an embodiment of the present invention.

FIG. 4 shows a section of the hub, blade and intervening connections of a wind turbine incorporating a blade pitch gear mounting structure according to a further embodiment of the present invention. FIG. 4 generally shows a hub 51 attached to a pitch bearing 52. A blade 53 is coupled to the bearing by a blade coupling arrangement 70 comprising a number of members. A pitch actuator system is provided, comprising an AC synchronous motor or hydraulic motor 55 for generating a torque, and a pinion 54 and a gear ring 57 to transmit the torque to the bearing 52 to rotate the turbine blade about its longitudinal axis. The pitch actuator system is coupled to the blade coupling arrangement 70 by a mounting flange 56 attached to one of the members of the blade coupling arrangement.

The hub 51 is attached to a pitch bearing 52 of the sort described in PCT application no. WO2007/006301. The blade 53 is attached or coupled to the pitch bearing 52. The pitch bearing includes at least one outer ring 58, at least one centre ring 60 and at least one inner ring 59. The hub comprises a mount area for each of the blade units, the mount area comprising at least two concentric load transferring surfaces 61/62 for attaching the blade unit via the at least one pitch bearing. The load transferring surfaces may be separated by at least one groove. The pitch bearing is attached to the hub at the load transferring surfaces by fasteners such as screws, bolts or studs.

The blade may be attached to the centre ring of the pitch bearing via the blade coupling arrangement 70 using fasteners such as screws, bolts or studs which may extend into the groove between the load transferring surfaces 61/62. The arrangement provides a direct path for the fasteners to pass through the bearing such that the fasteners may be substantially straight, such as a straight bolt 75 fastened by a nut either at the bearing end or the blade coupling flange end.

The pitch actuator or motor 55 may be supported by a support flange for holding the pitch actuator in a position such that the attached pinion engages with the gear ring. The support flange preferably couples the pinion to the hub such that it can produce a relative rotation between the relevant portion of the bearing and the hub.

Figure 5:
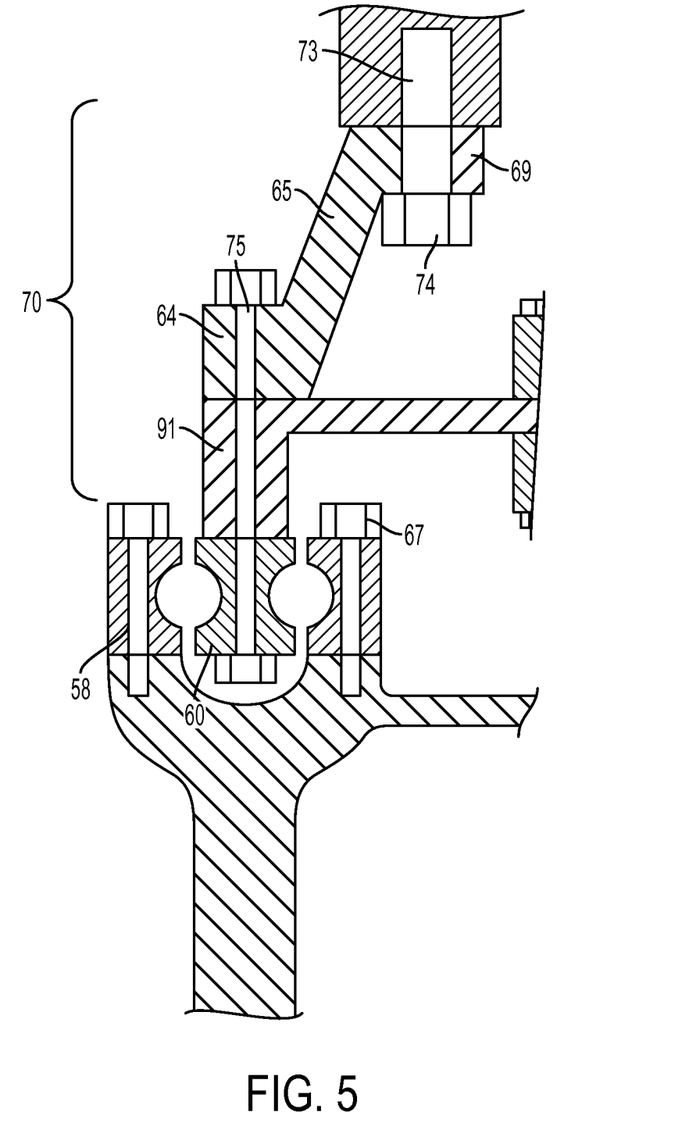
FIG. 5 is an expanded view of the blade coupling arrangement of FIG. 4.

FIG. 5 shows an enlargement of the bearing and blade portion of FIG. 4 and will now be referred to in conjunction with FIG. 4. The blade coupling arrangement is shown generally by reference 70 and will be referred to as the blade coupling flange. The blade coupling flange connects the blade 53 to the bearing 52, extending generally/substantially in a direction parallel to the axis of rotation of the bearing, and comprises at least three main sections. The first section is a bearing coupling portion 64 for coupling the flange 70 to the bearing 52, although in some examples this will be via a further member such as coupling member 91 described below. The second section is an intermediate section 65 which is arranged at an angle to the axis of rotation of the bearing, rather than being substantially parallel to it. The third section is a blade coupling portion 69 for coupling the blade or blade root to the coupling flange and therefore to the bearing. The intermediate section is located between the bearing coupling portion and the blade coupling portion. In one embodiment, all sections of the blade coupling flange are formed as an integral piece. As a result of providing a coupling flange with a deflected intermediate section 65 it is possible to fasten the blade to the hub by fasteners located inside the structure of the wind turbine hub/blade coupling arrangement.

The first section 64 may couple to the bearing via an additional coupling member 91 located between the bearing and the bearing coupling portion 64. This additional coupling member is part of the mounting flange 56, which serves to couple the gear and pinion mechanism 54/57 to the bearing and will be referred to as the gear ring mounting flange. The mounting flange 56 is coupled to the same ring of the bearing as the blade. The member 91 may be integral with the first section 64, and therefore may also be integral with the entire blade coupling flange, which can be formed as a single piece.

Figure 6:
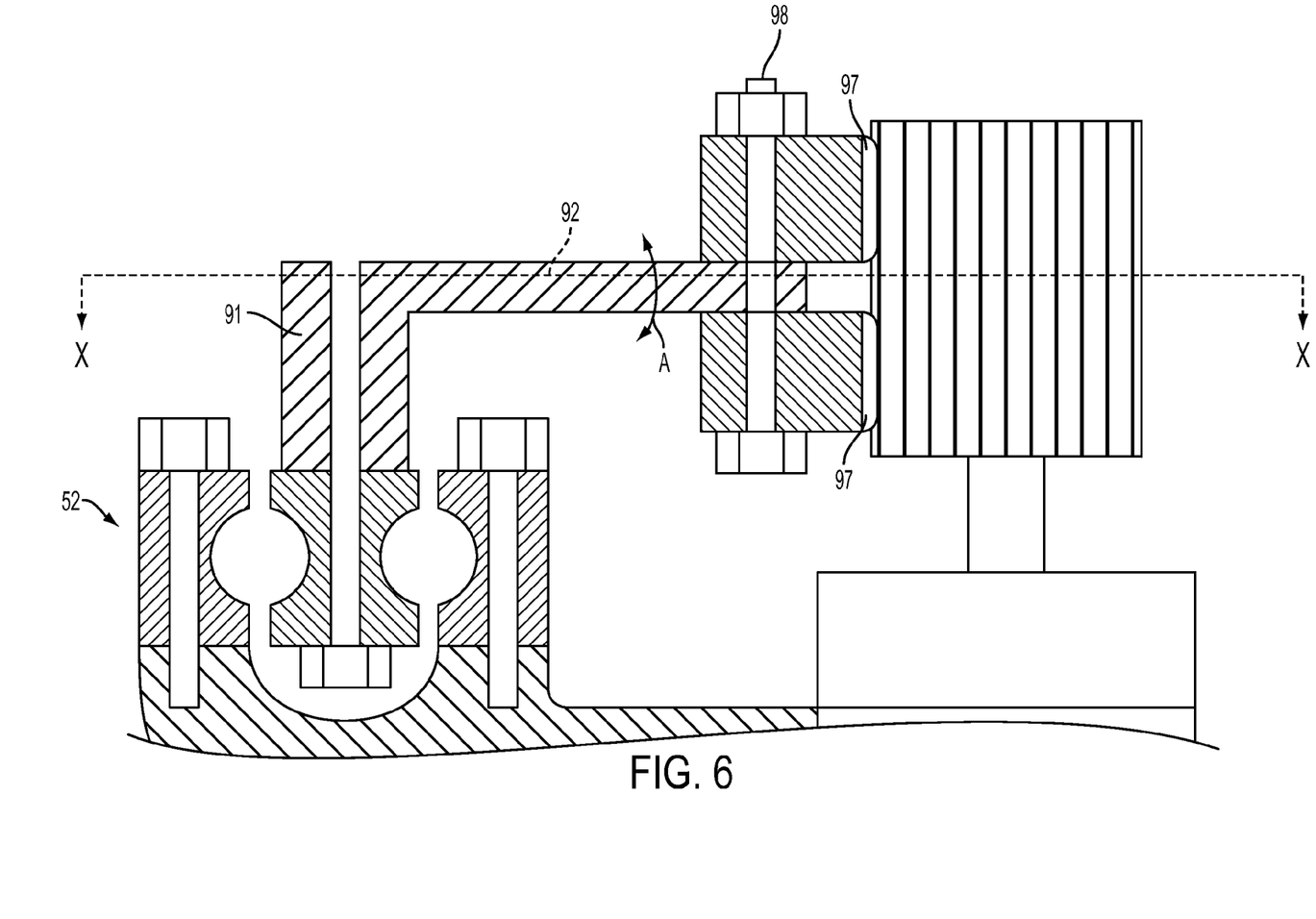
FIG. 6 is an expanded view of the gear support arrangement of FIG. 4 according to an embodiment of the present invention.

FIG. 6 shows an enlargement of the gear ring mounting flange, bearing and gear and pinion arrangement. The gear ring mounting flange comprises a first portion 91 for coupling the flange to the pitch bearing 52, and a second portion 92 extending radially inward towards the axis of rotation of the bearing to which the gear ring is attached. The first portion extends along a direction from the bearing to the blade tip to support the second portion 92 closer to the blade tip than the distance between the blade tip and the bearing. In one embodiment, the second portion extends inwardly at an angle substantially perpendicular to the axis of rotation of the bearing, although it is possible that the second portion extends at an angle greater or less than substantially 90° to provide a conical shape with sloping sides.

Figure 7:
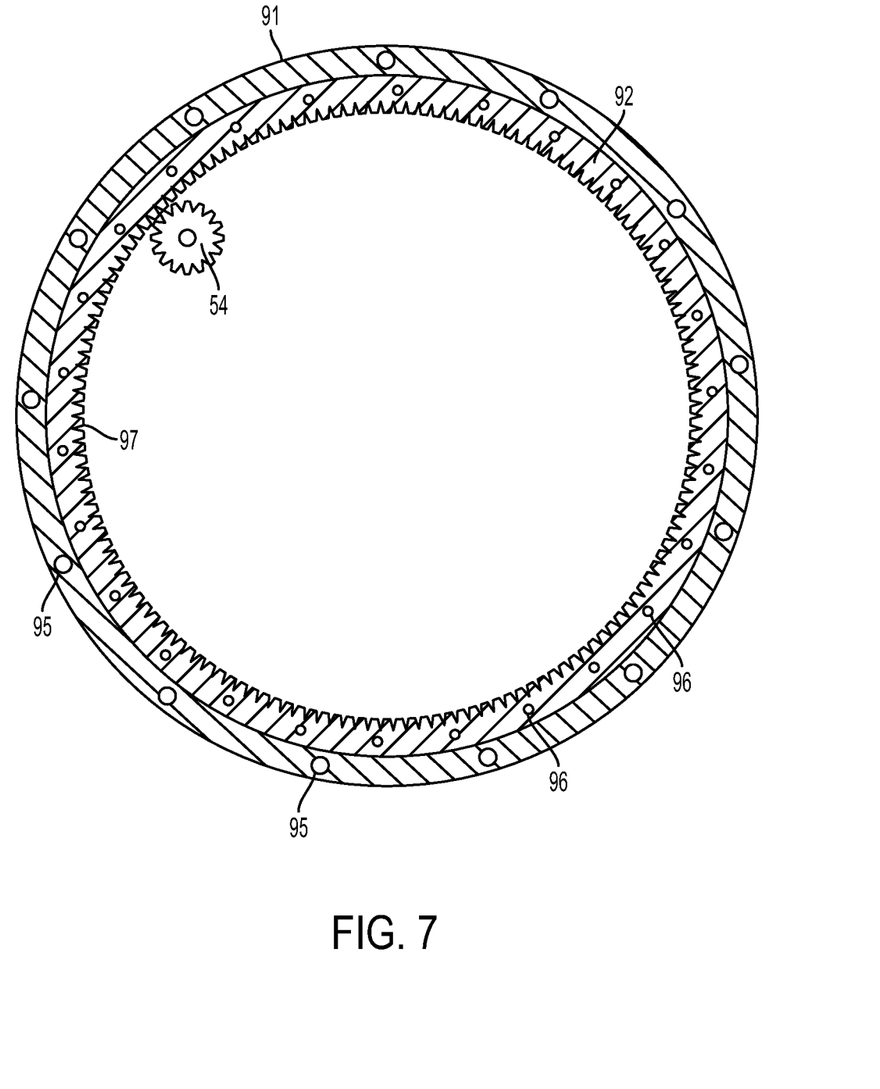
FIG. 7 is a cross sectional view of the gear ring mounting flange, gear ring and pinion along the line X-X, but excluding the gear mounting feature, according to an embodiment of the present invention.

FIG. 7 shows a cross-sectional view of the gear ring mounting flange, gear ring and pinion along the line X-X of FIG. 6, but does not show the attachment assembly 98 described in more detail below. The first portion 91 and second portion 92 of the gear ring mounting flange are shaped as an annulus, centred on the axis of rotation of the pitch bearing. They may be integrally formed as a single piece, but could be bonded together by a suitable method such as welding or using nuts and bolts. The dimension of the first portion in the direction of the axis of rotation of the bearing may be greater than the dimension of the second portion such that the second portion is supported at a certain distance further along the axis of rotation of the bearing than the bearing itself in relation to the blade tip. This allows the gear ring mounting flange to couple the gear ring arrangement to the central ring of the three ring bearing. It also ensures that the second portion extends over the nuts 67 attaching the bearing to the hub.

Although not shown in FIG. 7, the second portion 92 may be attached to the gear ring 97 by an attachment assembly 98 shown in FIG. 6. In this embodiment, the gear ring assembly is shown as comprising two co-axial gear rings centred on the axis of rotation of the bearing and separated along the axial direction of the bearing. The attachment assembly comprises a bolt and nut to retain the gear rings in position, although the gear rings may be connected to the gear ring mounting flange by any other suitable fasteners. Other embodiments may use a single gear ring or more than two. Alternatively, the pitch gear may be formed integrally with the inner circumference of the gear ring mounting flange. In any case, a pinion 54 engages with the one or more gear rings 97. The pinion is driven by a motor, such as an AC synchronous motor or a hydraulic motor. The pinion is attached to the hub 51.

Figure 8:
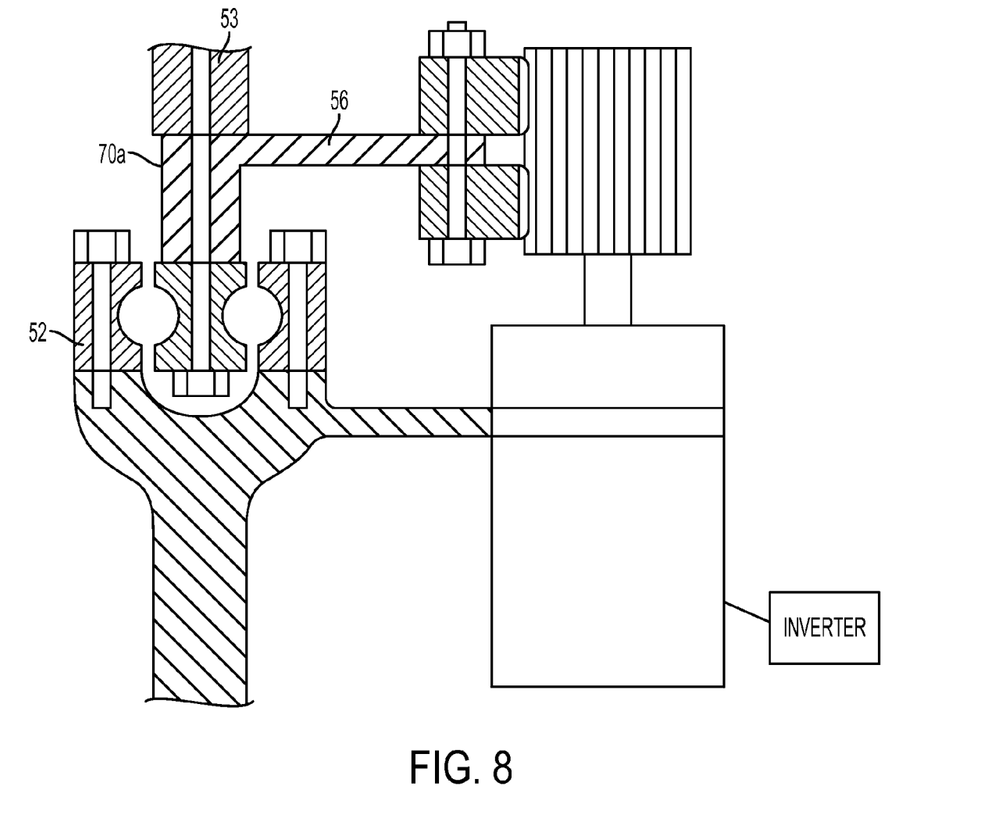
FIG. 8 is a cross section of a portion of an alternate blade coupling arrangement and gear support arrangement.

In some embodiments, rather than using a single gear, two or more gears, preferably ring gears, may be coupled to the bearing, the ring gears being separated along the axis of rotation of the bearing as shown in FIGS. 4, 6 and 8. One or more pinions, coupled to one or more actuators, such as an electric or hydraulic motor, are arranged to engage with one or more of the two or more pitch gears and to cause rotation of a rotor blade with the bearing. Having two or more ring gears engaging with a common pinion, or each engaged with separate pinions, to rotate the bearing reduces the weight of the ring gear, since two ring gears separated along the axis of rotation of the bearing can be made lighter than a single ring gear whilst covering the same length along the bearing axis. The two or more ring gears may be mounted so that they rotate about a common centre, such as with the ring gears being arranged to rotate about the axis of rotation of the bearing and the teeth of each ring gear being aligned with the teeth of the other ring gears along a line substantially parallel to the axis of rotation of the bearing. The gear rings may be directly attached to the bearing, such as with releasable fasteners, or may be coupled to the bearing via a flange so that the gear rings are not in direct contact with the bearing. Again, the gear rings may be attached to the coupling flange by releasable fasteners to allow for replacement and adjustment of the gear rings.

In order to pitch the rotor blade, a torque is generated by the motor and transmitted to the pinion by the motor shaft. The pinion rotates and transfers torque to the gear ring causing the gear ring and the attached load of the blade to rotate with the middle ring of the bearing. The pinion may rotate clockwise or anti-clockwise.

The gear ring mounting flange may be made of steel or similar material, and may be made of the same material used for the bearing. The annulus structure of the mounting flange ensures that the second portion is stiff in the radial and circumferential directions. The dimension in the axial direction can be arranged so that the flange is relatively more flexible in the axial direction of the bearing A to allow for movement along this axis. In large scale commercial turbines the thickness of the second portion in the axial direction of the bearing may be between 10 mm and 30 mm, preferably between 15 mm and 25 mm and more preferably around 20 mm. The axial distance between the bearing and the second portion of the gear ring mounting flange is determined by the extension of the first portion of the gear ring mounting flange and should be large enough for the flange to extend over the bolt fastening the inner bearing ring to the hub. It may be preferable for the gear surface to have as large a diameter, relative to the rotational axis of the bearing, as possible so that the mechanical advantage is maximised. Therefore, the gear surface should be located at a position having a radial distance to the axis of rotation of the bearing that is as close to the corresponding radial distance of the inner bearing ring as possible. The flange can be arranged to support the gear in a position such that these radial distances are substantially equal, but for large turbines having a bearing diameter of, for example, 2 metres up to around 6 metres, it may be sufficient for the second portion to extend around 30 to 50 cm into the structure, in the radial direction of the bearing.

The relative flexibility of the gear ring mounting flange allows tension in the gear ring to be distributed and uneven tensions to be compensated for. For a single gear ring, the gear ring mounting flange could contact the gear ring at the midpoint of its dimension extending in the direction of the axis of rotation of the bearing such that an equal amount of gear tooth length extends above and below the join with the mounting flange. A higher tension on either side of the gear ring, i.e., on the top and bottom sides above or below the plane of the gear ring mounting flange relative to the axis of rotation of the bearing, due to unequal loading or momentary unbalanced forces will cause the gear ring mounting flange to flex to compensate. For multiple gear rings, as shown in the FIGS. 4, 6 and 8, the mounting flange supports gear rings either side and compensates for changes in the load distribution between the gear rings by flexing in the same way described for a single gear ring.

Still with reference to FIG. 7, the first portion has a number of holes 95 distributed around the circumference to allow fasteners, such as bolt 75, to pass through and connect to the bearing. The gear ring mounting flange can therefore be incorporated into a typical blade mounting arrangement in which a bolt, or other protrusion, extends from the blade through a receiving hole in the bearing and is fixed by fasteners such as a nut. The bolt or protrusion may alternatively extend from the bearing into the blade.

The second portion also has a number of holes 96 distributed around the area of the annulus, such as all at the same distance from the centre. These holes are positioned to provide access to the nuts 67 securing the bearing inner ring to the hub. The nuts 67 may therefore be adjusted or replaced without removing the gear ring mounting flange. This plurality of holes has the additional advantage of reducing the overall weight of the gear ring mounting flange structure. The holes would have a radius of at least the size of the nut, although larger may be preferable to allow space to access and adjust the bolt and possibly replace it.

The arrangements described above have used a blade coupling arrangement in which the joint at which the blade is attached to the blade coupling flange has a smaller diameter to the joint at which the blade coupling flange is attached to the bearing. Therefore, the pitch circle diameter of the joint between the blade coupling flange and the bearing is greater than the pitch circle diameter of the joint between the blade coupling flange and the blade. At least a portion of the intermediate section is arranged such that the radial distance of the flange to the axis of rotation of the blade pitch bearing varies over the portion so that the blade coupling flange defines a volume internal to the hub and/or rotor blade structure for receiving fasteners for attaching the rotor blade to the blade coupling portion. In particular, the intermediate section 65 extends at an angle to the axis of rotation of the bearing and provides a tapering or conical shape that reduces in diameter along the direction parallel to the axis of rotation of the bearing 52 from the blade root to the blade tip. The blade coupling flange, or intermediate section, may extend along a line passing through the centre of the pitch bearing structure, between the inner and outer bearing rings, and through the centre of lift of the blade.

FIG. 8 shows a blade coupling arrangement and gear support arrangement in which the blade 53 is mounted more directly to the bearing by a blade coupling flange 70a. The blade coupling flange 70a does not include a portion whose radial distance to the axis of rotation of the bearing varies. The blade coupling flange 70a is also part of the gear ring mounting flange, with the two possibly being formed as an integral piece. The blade is mounted using a protrusion that extends through the blade coupling flange 70a and through the middle ring of the bearing 52 where it is fixed in place by an attachment member such as a nut.

Figure 9:
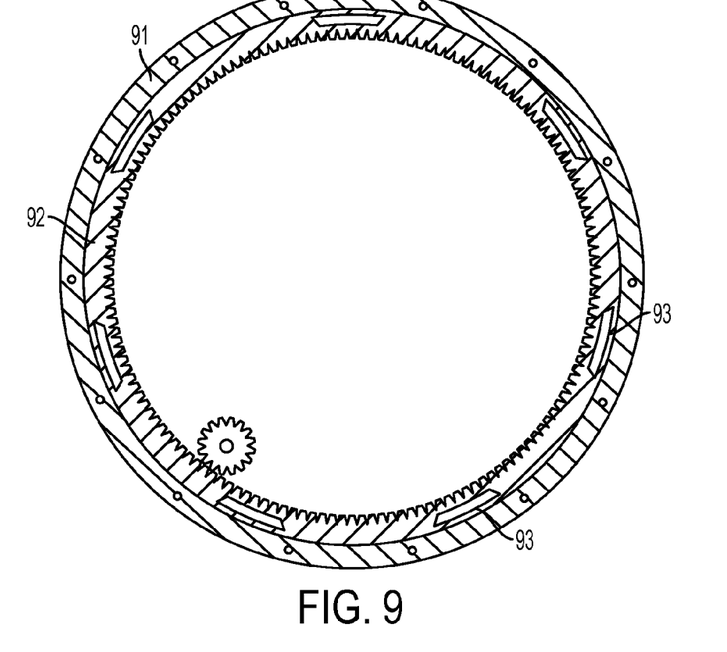
FIG. 9 is a cross sectional view of an alternative embodiment of the gear ring mounting flange.
Figure 10:
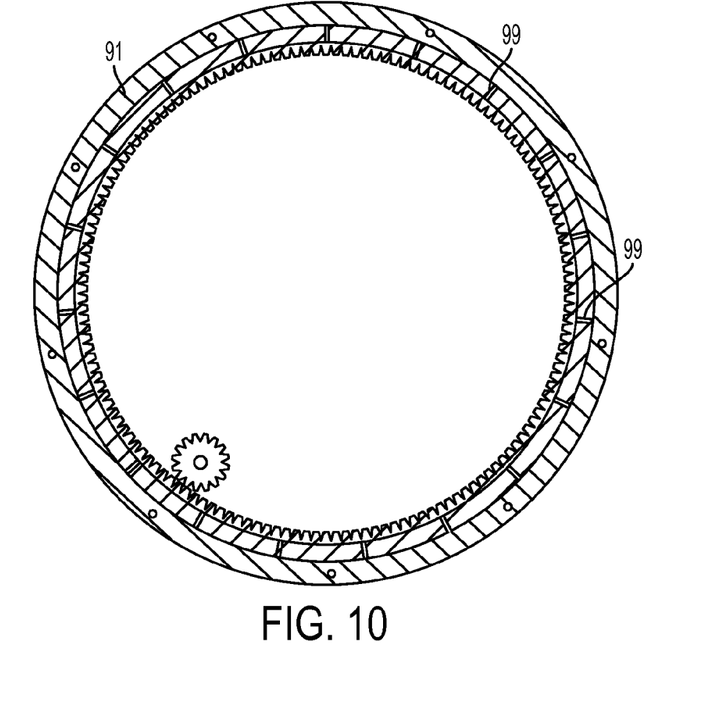
FIG. 10 is a cross sectional view of a further alternative embodiment of the gear ring mounting flange.

FIGS. 9 and 10 show alternative embodiments for the gear ring mounting flange. In the embodiment of FIG. 9, the first portion of the flange 91 is secured to the pitch bearing and the second portion 92 extends radially towards the bearing rotation axis. The second portion comprises a number of holes or cutaway sections 93 formed in a single annular disc. Each of the cutaway sections is shaped like a trapezoid, with the two longer sides being curved and following the curvature of the annulus, although it will be appreciated that different shapes for the cutaway sections are possible. The cut out sections save weight and also allow easy access to the retaining nut coupling the bearing and hub together.

In the embodiment of FIG. 10, rather than using a single disc for the second portion, a plurality of elongated members, such as spokes or rods 99, are attached to the first portion and used to support the gear ring.

It is not necessary for the blade to be able to pitch through 360°, meaning that the gear ring does not need to extend around the entire circumference of the mounting flange. Equally, therefore, the mounting flange does not need to extend around the entire circular circumference of the blade root. Instead, the gear ring mounting flange may extend around only a portion of the circumference of the blade root, the portion covering, for example, substantially the same circumferential segment as the gear ring.

The embodiments described show components of the blade coupling flange, such as the first and second portion, as being integrally formed as a single piece. They may instead be attached together by appropriate fasteners such as bolts or pins. It is also possible for the blade coupling flange to be integral to the bearing ring to which it is attached, which would remove the need for bearing fasteners such as bolt/nut arrangement 75.

Figure 11:
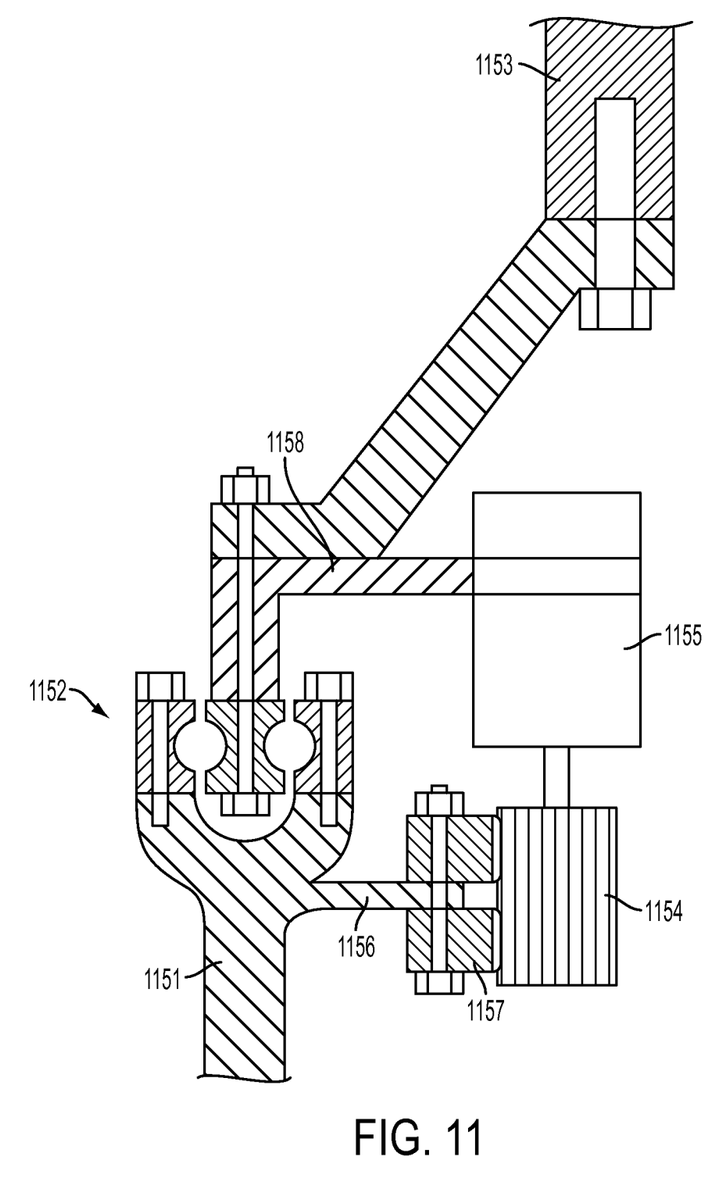
FIG. 11 shows an example of an arrangement in which the pitch gear is coupled to the hub rather than to the bearing.

Examples have been described in which the gear ring is coupled to the bearing, with the driving pinion being coupled to the hub such that the pitch motor's torque is thus transferred to the bearing to cause relative rotation between the blade and the hub. However, it is possible for the gear ring to be coupled to the hub instead, with the pinion being coupled to the bearing. FIG. 11 shows an example of such an alternative arrangement, in which the pinion 1154 is coupled to the bearing 1152 via the motor 1155, which is attached to the bearing by support member or support means 1158. The support means could be attached directly to the bearing or it may be coupled to, or part of a blade coupling flange in a similar arrangement to the coupling of the pitch gear flange described above. The pitch gear 1157 is releasably coupled to the hub, with a gear mounting flange 1156 extending radially inward towards the axis of rotation of the pitch bearing. The gear mounting flange 1156 can have the same features as described for the embodiments in which the pitch gear is coupled to the bearing, but it will be appreciated in this example that the portion 91 shown in FIG. 6 will not be required, since the flange can be coupled directly to the hub.

Certain embodiments of the invention have been described in relation to a three ring bearing having an inner, outer and central ring and the blade being connected to the central ring by the blade coupling flange. It will be appreciated that embodiments of the invention may be used to connect the blade to the inner, outer or both rings or can be utilised in other types of bearing, such as a two ring bearing. The term "ring gear" used throughout the description is intended to refer to the fact that, in some embodiments, the gear teeth are formed on a ring structure. There is no requirement for the gear teeth to extend around the entirety of the circumference of the ring; the teeth may only extend around a portion thereof.

The invention claimed is:

1. A system for a wind turbine, comprising:
   a pitch system comprising a pitch bearing and a wind turbine hub, the pitch bearing being attached to the hub and being attachable to a wind turbine rotor blade, the pitch bearing defining an axis of rotation of the pitch bearing and an inner bearing circumference;
   a pitch gear releaseably coupled to the pitch system; and
   a flange for coupling the pitch gear to the pitch system, the flange being connected to the pitch bearing and further configured to be connected to the rotor blade such that the blade couples to the bearing through the flange,
   wherein the pitch gear is positioned between the axis of rotation and the inner circumference of the pitch bearing and spaced from the inner circumference in a direction substantially perpendicular to the axis of rotation of the pitch bearing, and
   wherein the pitch gear is further positioned between the pitch bearing and a blade tip and spaced from the pitch bearing in a direction substantially parallel to the axis of rotation of the pitch bearing.

2. The system according to claim 1, wherein the pitch gear is releaseably coupled to the pitch bearing or to the hub.

3. The system according to claim 1, wherein the flange is configured to extend in a direction substantially perpendicular to the axis of rotation of the pitch bearing.

4. The system according to claim 1, wherein the flange comprises a first portion and a second portion, and wherein:
   the first portion is configured to connect to the pitch bearing and support the second portion between the blade tip and the pitch bearing; and
   the second portion is configured to extend into the space between the circumference of the pitch bearing and the axis of rotation of the pitch bearing.

5. The system according to claim 1, wherein the flange includes a mounting arrangement for receiving the pitch gear, the mounting arrangement configured to support the pitch gear proximate to the flange and between the flange and the axis of rotation of the bearing.

6. The system according to claim 5, wherein the mounting arrangement has a plurality of holes for receiving a bolt.

7. The system according to claim 1, wherein the flange is in the shape of an annulus having one or more holes formed therein, the holes being distributed at a predetermined radius corresponding to the radial position of a fastener between the pitch bearing and the wind turbine hub, the one or more holes being sized so as to allow access to the fastener.

8. The system according to claim 1, wherein the flange comprises a plurality of elongated members, the elongated members including spokes.

9. The system according to claim 1 wherein the bearing is a three ringed bearing and the pitch gear is releaseably coupled to the middle ring.

10. The system according to claim 9, wherein the flange couples the wind turbine pitch gear to the middle ring of the three ring pitch bearing.

11. The system according to claim 1, wherein the pitch gear is directly, and releasably, attached to the pitch bearing.

12. A wind turbine comprising:
    a wind turbine rotor blade;
    a wind turbine hub;
    a pitch bearing for rotatably mounting the rotor blade to the hub, the pitch bearing being attached to the hub and to the wind turbine rotor blade and defining an axis of rotation and an inner bearing circumference;
    a pitch gear releaseably coupled to the pitch bearing; and
    a flange coupling the pitch gear to the pitch bearing, the flange being connected to the pitch bearing and connected to the rotor blade such that the blade couples to the bearing through the flange,
    wherein the pitch gear is positioned between the axis of rotation and the inner circumference of the pitch bearing and spaced from the inner circumference in a direction substantially perpendicular to the axis of rotation of the pitch bearing, and
    wherein the pitch gear is further positioned between the pitch bearing and a blade tip and spaced from the pitch bearing in a direction substantially parallel to the axis of rotation of the pitch bearing.

* * * * *